United States Patent [19]
Fike

[11] 3,734,704
[45] May 22, 1973

[54] METHOD OF MAKING GLASS ARTICLES

[75] Inventor: Roy Albert Fike, Waco, Tex.

[73] Assignee: Owens-Illinois, Inc., Toledo, Ohio

[22] Filed: Oct. 15, 1971

[21] Appl. No.: 189,755

Related U.S. Application Data

[63] Continuation of Ser. No. 15,523, March 2, 1970, abandoned.

[52] U.S. Cl. ..........................65/69, 65/70, 65/83, 65/104, 65/113, 65/114, 65/120, 65/184
[51] Int. Cl. .......C03b 9/14, C03b 2/100, C03b 25/00
[58] Field of Search........................65/120, 113, 114, 65/69, 70, 83, 184, 112

[56] References Cited

UNITED STATES PATENTS

| | | | |
|---|---|---|---|
| 1,857,492 | 5/1932 | Beatty | 65/113 |
| 2,391,963 | 1/1946 | Gray | 65/184 X |
| 2,280,268 | 4/1942 | Schutz | 65/184 X |
| 1,674,367 | 6/1928 | Kehl | 65/113 |
| 3,510,287 | 5/1970 | Panczner | 65/113 |
| 3,155,481 | 11/1964 | Boyce | 65/109 X |
| 3,125,429 | 3/1964 | Lauck et al. | 65/111 X |
| 2,239,627 | 4/1941 | Schutz | 65/113 |
| 2,764,847 | 10/1956 | Buell | 65/113 |
| 3,188,189 | 6/1965 | Leeuw | 65/113 |
| 2,215,980 | 9/1940 | Schreibeb | 65/113 |

Primary Examiner—Frank W. Miga
Attorney—J. R. Nelson and E. J. Holler

[57] ABSTRACT

A method of forming a hollow glass article including a bulbous base portion and an open neck portion wherein the glass article initially formed is inclusive of an integral moile, with a compressive stress on the outer surface by first forming the glass article from a ribbon of glass by blowing the glass outwardly against the sides of the rotating mold, severing the article from the ribbon of glass, and allowing the blown article to cool which provides substantially uniform compressive stresses throughout the outer surface thereof; shaping the neck portion of the article by burning off the moile and forming a finish rim in bead form which disturbs the compressive stresses in an area of the neck portion; whereupon the area of the neck is heated and quenched to re-establish the compressive stresses in the outer surface of the neck portion as well as the balance of the outer surface of the article.

10 Claims, 7 Drawing Figures

Patented May 22, 1973  3,734,704

INVENTOR.
ROY ALBERT FIKE

BY J. R. Nelson and
E. J. Holler
ATTORNEYS

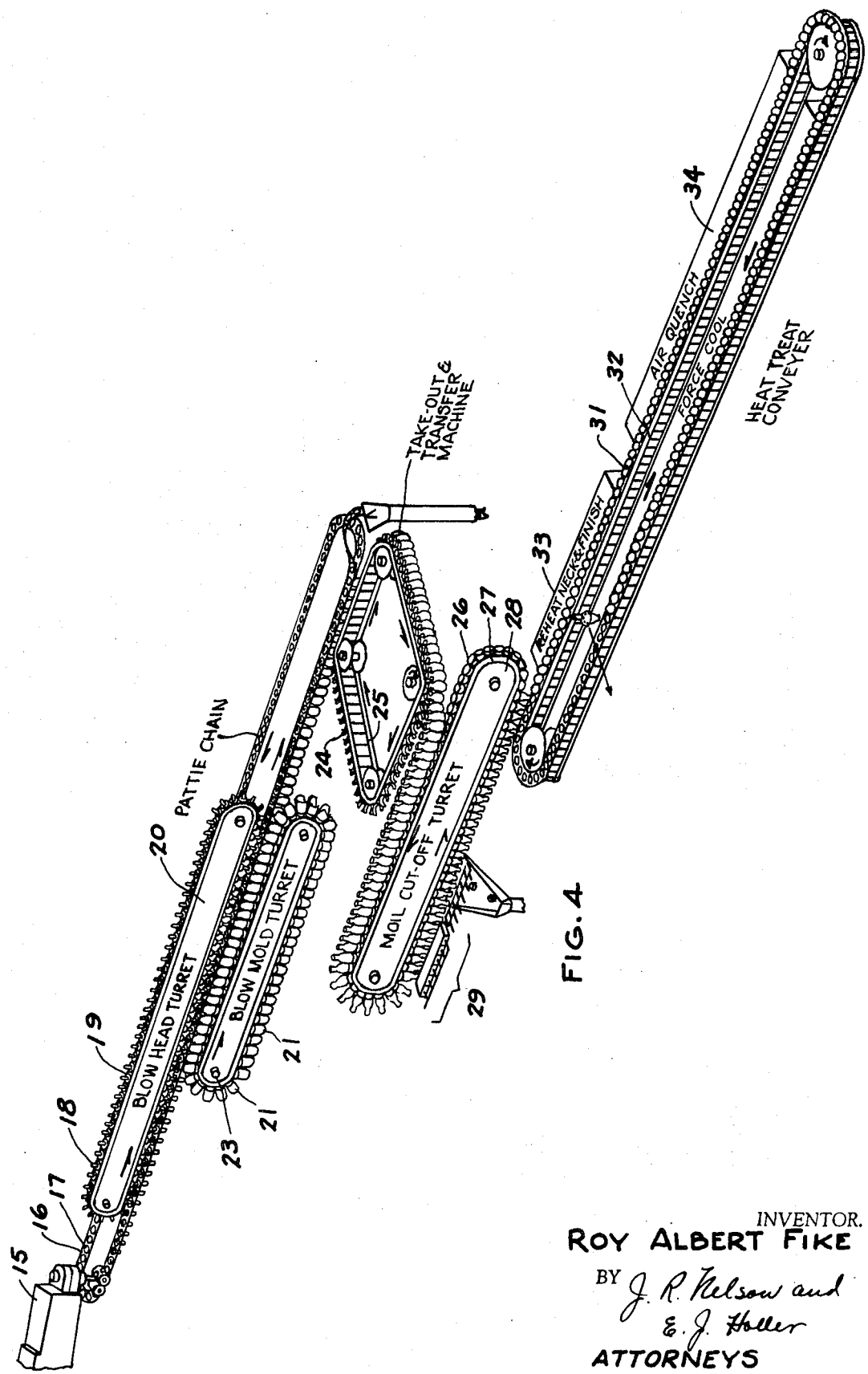

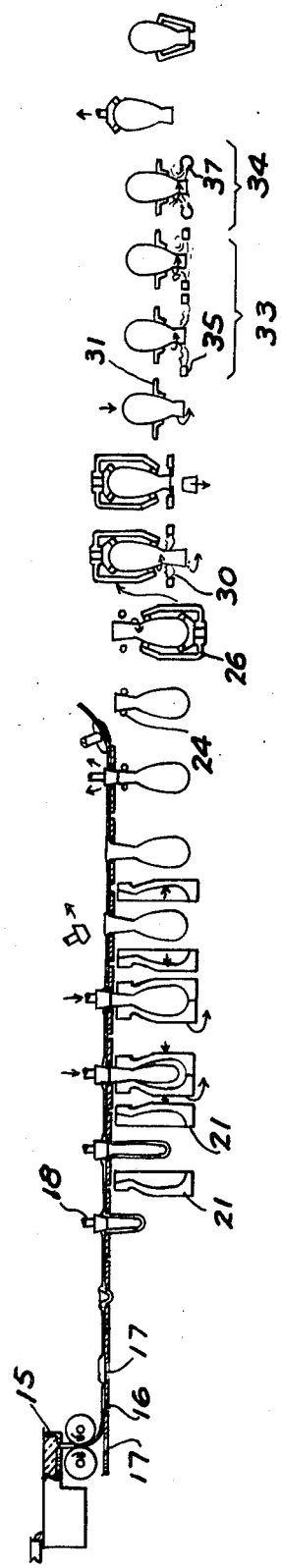
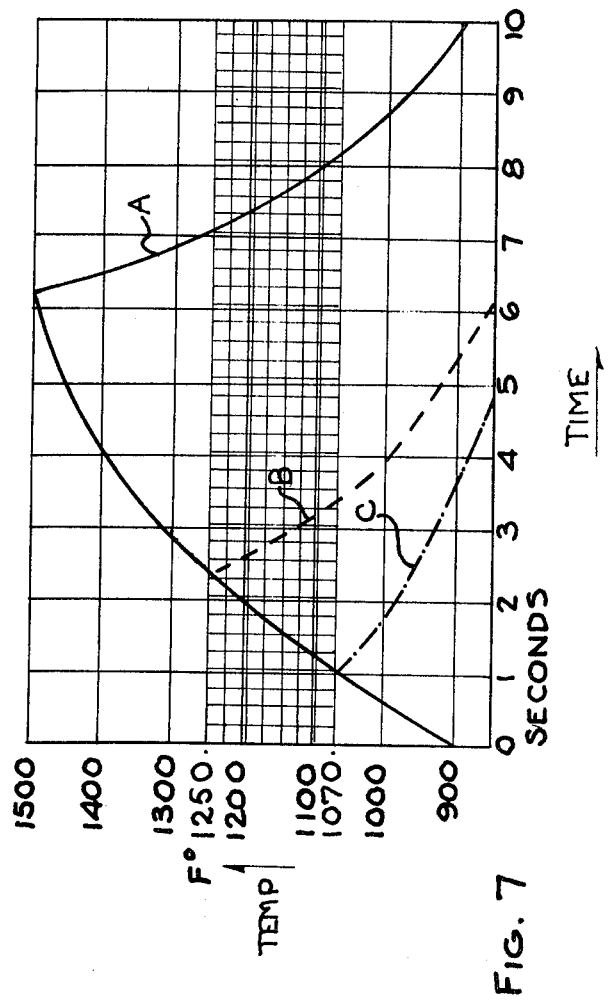
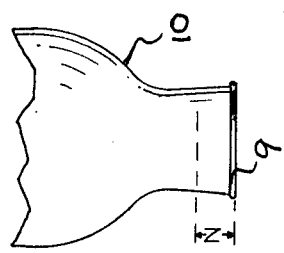

3,734,704

METHOD OF MAKING GLASS ARTICLES

This is a continuation of application Ser. No. 15,523, filed Mar. 2, 1970, now abandoned.

BACKGROUND OF THE INVENTION

This invention relates to forming hollow glass articles and particularly to forming hollow glass articles having compressive stresses on the exterior surface thereof.

Among the objects of the invention are to provide a hollow glass article having a bulvous body portion, a substantially uniform thickness, and a neck portion wherein the exterior surface of the article is under compressive stress.

SUMMARY OF THE INVENTION

Basically, the method embodying the invention comprises forming the glass article from a ribbon of glass by blowing the glass outwardly against the sides of the rotating mold, severing the article from the ribbon of glass, and upon cooling the article a substantially uniform compressive stress layer is provided on the outer surface thereof, shaping the neck portion of the article by burning off a moile segment of glass and concurrently forming the neck rim or finish of the article that defines the mouth opening of the article, such shaping disrupting the compressive stresses in an annular region of the article at and immediately the neck rim; whereupon, just the rim and narrow adjacent annular region of glass is thereafter heated and air quenched to re-establish compressive stress in the outer surface of the article including the neck portion shaped after forming.

DESCRIPTION OF THE DRAWINGS

FIG. 4 is a partly diagrammatic perspective view of an apparatus embodying the invention.

FIG. 5 is a diagrammatic view of the apparatus.

FIG. 6 is a fragmentary view of a portion of the apparatus.

FIG. 7 is an exemplary curve of temperature versus time employed in the method embodying the invention.

DESCRIPTION OF THE INVENTION

Figure 1:
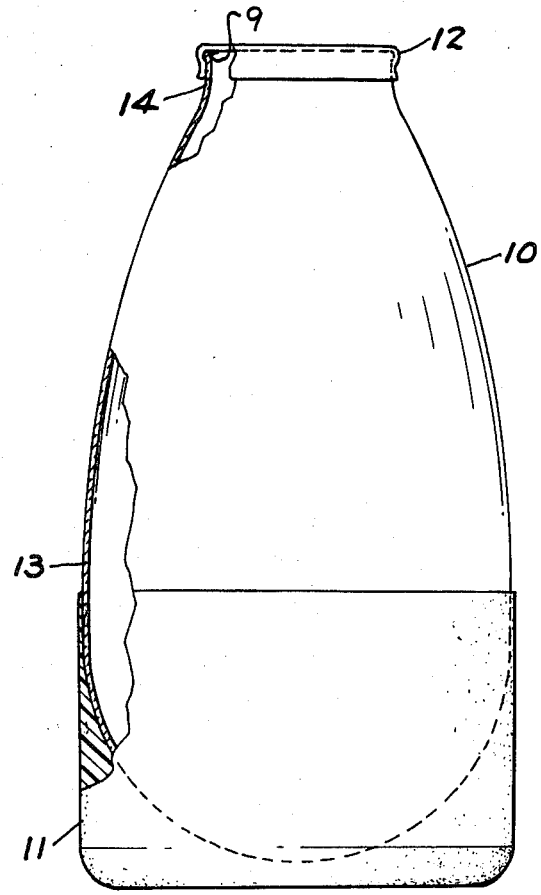
FIG. 1 is a part sectional elevational view of a container made in accordance with the invention.

The invention relates to forming hollow glass articles which are adapted to be used, for example, in forming a glass composite package, such as shown in FIG. 1, including a hollow glass article or envelope 10, a cup-shaped base 11, preferably of a different material, such as plastic, and a closure 12. Such a glass composite package is disclosed and claimed in U.S. Pat. No. 3,372,826.

Figure 2:
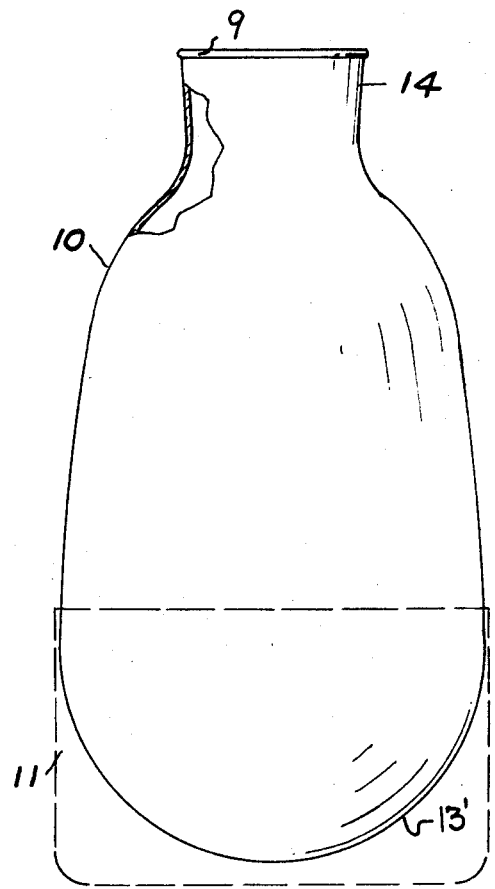
FIG. 2 is a part sectional view of a slightly modified form of container.
Figure 3:
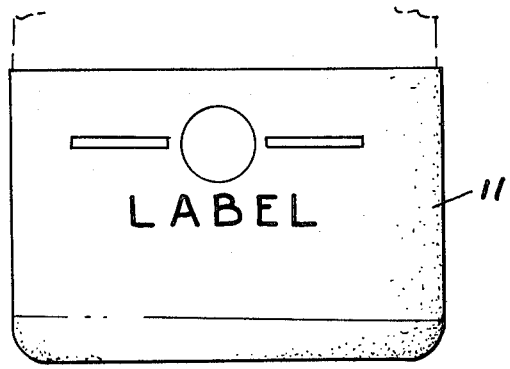
FIG. 3 is a side elevational view of a portion of the container.

As shown in FIG. 1, the glass article or envelope 10 is relatively thin and light in weight and of substantially uniform thickness throughout. The wall thickness here contemplated is on the order of 0.040 to 0.070 inch, except for the somewhat thicker bead or rim 9 at the mouth opening of the envelope. The envelope further includes a bulbous portion 13 or 13' as in FIG. 2 and an upper open neck portion 14 terminating with said rim 9.

The entire outer surface of the article 10 is under compressive stress thereby increasing its resistance to impact and other similar loads.

The glass article embodying the invention is made in accordance with the apparatus as shown in FIG. 4 and the process diagrammed on FIG. 5 wherein a molten ribbon of glass is fed from the forehearth a of a glass furnace and formed into a ribbon of glass containing integral, spaced masses or paddies of glass that are received onto an orifice plate chain 16 having a plurality of spaced orifices 17 therein. The portion of the glass overlying each orifice 17 is permitted to sag into the orifice and depend below the plate chain, and the paddies are successively engaged by blow pipes 18 on an endless chain 19 of a blow head turret 20. The glass flows downwardly through the orifice and is puffed and later blown outwardly against the sides of partible molds 21 by introduction of air through blow pipes 18. The rotating paste molds 21 are mounted for operation on the endless chain of a blow mold turret 23 moving underneath the orifice plates 16. The apparatus for forming the articles may be the known glass ribbon forming machine shown in the U.S. Pat. to W. J. Woods et al., No. 1,790,397 and described in Handbook of Glass Manufacture, pages 356–8, edited and compiled by F. D. Tooley, (1953). The ribbon machine is commonly utilized to form glass envelopes for incandescent electric lamps. As is typical of the rotary paste mold type of glass forming — especially on ribbon glass machines — the blown glass article includes an upper hollow segment that connects the main body of the envelope of glass with the parent ribbon. This connecting segment is later removed upon finishing the article, such as 10 on FIG. 1, by burn-off or flame cutting the glass in the neck region. The portion burned off and discarded is known as the moile of the article formed in the paste molds 21.

Each article formed in molds 21 is connected to the remainder of glass in the ribbon of glass by the moile as the article approaches a take out and transfer machine, whereat the articles are successively severed at the top of the moile from the ribbon by suitable means, such as a mechanical knife or plough, stationary at the underside of the orifice plates 16. At the time they are severed from the ribbon, each article is immediately grasped by grippers 24 mounted in a succession on an endless chain 25 and transferred to the chuck 26 on the conveyor chain 27 of a moile cut-off turret 28.

The examples herein stated apply to the glass compositions known in the industry as soda-lime glass compositions which are most generally used in glass container manufacture. At the time the molten glass is fed from the parent body in the furnace to form the streams from which the ribbon and articles are shaped, the temperature of the glass is about 2050°F. During the forming operation and this transfer of the articles from the ribbon, the glass is cooling progressively from the higher temperature such that a layer of compressive stress is provided on the exterior surfaces of the articles after they are separated from the ribbon.

Each of the articles has the open-ended moile portion whereat it was broken or "cracked-off" from the ribbon. The moile is next to be removed and a mouth rim is to be formed or shaped on the neck of the article. The moile portion is cut off, burned-off or severed in a neck shaping zone 29 wherein burners 30 direct a fine line of flame against succeeding, inverted, rotating articles until the moile of each drops off. The burners in the neck shaping zone apply flame to also fire polish the free edge of each neck portion and form the rim or bead 9 on the envelope 10. In this necessary reshaping process, the reheating of the glass disturbs the compressive stress in the articles around a narrow band of the area at and closely adjacent the neck rim. In most instances this band involves from one-half to 1 inch of axial dimension from the rim. It is preferred the neck rim be formed with an annular bead, and, as was stated, this bead is shaped and fire polished in the burn-off operation.

The chain 27 delivers each of the articles to cups 31 of an endless conveyor 32 by lowering and releasing them with the neck and rim of each extending downwardly. The articles are then supported in inverted position by the cups of the conveyor 32. The conveyor 32 moves the articles through a reheating zone 33 and quenching zone 34. In the reheating zone 33, heat from elongated burners 35 is applied to the narrow band of area (approximately 1 inch wide) about the necks of the containers to heat the neck portions.

As the glass article traces its thermal history from the furnace — it is fed at about 2,050°F — the walls of the article are formed to the thin, uniform distribution mentioned of from 40 to 70 thousandths of an inch. Preferably, the glass thickness is on the order of 50 thousandths. At the time the glass article is deposited into the burn-off machine and just prior to burn-off, the glass wall is cooled in temperature to about 900°–1,000°F. This is below the annealing temperature from soda-lime glass. Normally, glasses of this type have an annealing temperature ranging from about 1,070° to 1,125°F.

The glass in the area of the burners is elevated in temperature to about 1,500° to 1,600°F, sufficient to burn the moile segment from the final wall of the article, and the temperature near 1,500°F is maintained to form and fire polish the bead or rim 9. After burn-off, the glass will cool again somewhere on the order of 700° to 1,000°F, preferably below 900°F, to the time the article is introduced into the burners of the reheating zone 33. The burners 35 now reheat the glass wall in this approximately 1 inch band adjacent rim 9 and including the rim to a temperature above the strain point of the glass, in the range of from 1,070° to 1,500°F and preferably on the order of 1,250°F. This heating in burner 35 will occur in a span of time of 4½ to 10 seconds, depending upon production speed on the machinery. The remaining or body portion of the article above the band of heat near rim 9 is not subjected to heating, and actually cools further thereby maintaining the compressive stress in that portion of the wall of glass. The articles are promptly moved through the air quench zone 34 after reheating, and air from quenching nozzles 37 is applied to the heated neck portions to quickly cool them. The major cooling is carried out over a period of about 4 to 6 seconds in which time the reheated glass cools to below 900°F and establishes compressive stress in the outer surface of the glass at the rim and in the neck portion.

Since the compressive stresses arising out of forming in the paste mold were removed by reheating that necessarily occurs at the band region of the glass of the neck in burn-off of the moile, the reheat and quench at the respective reheating and quenching zones 33 and 34 re-establishes the compressive stresses on the neck and rim surface portions thereby placing the entire surface of the article (envelope 10) in a condition of compressive stress.

On the exterior surface of the glass wall of the envelope, it is preferred that the compressive stress developed compare to approximately 2,000 psi (measured by standard polariscope and light retardation techniques and extrapolated to a psi measurement).

Referring to FIG. 7, the graph illustrates the thermal gradients of the reheating and cooling phases of the treatment of a band about the rim 9 of the envelope 10.

The maximum condition is shown by curve labelled A. Assuming the glass envelope 10 after it is burned off in the burners 30 (FIG. 5) enters the reheating apparatus 35 at a temperature of 900°F, the band or zone of glass N above the rim (see FIG. 6) may be reheated at the rate following the time-temperature curve A until the exterior surface temperature of the glass wall is at about 1,500°F. Thereafter, the entry into cooling zone 34 cools this glass wall surface N along the curve A to about 900°F or below.

The lower curve C represents the minimum practical heat treatment. In this treatment C, it is seen that the glass surface N is heated from 900° to about 1,070°F and thereafter cooling zone 34 lowers the temperature thereof to below 900°F.

The intermediate curve B represents the preferred treatment. In this case, the glass N is heated to about 1,250°F in zone 33, and thereafter quenched in cooling zone 34 to below 900°F.

The area on FIG. 7 represented by the cross-hatched lines indicates the best practical production range of reheating and cooling soda-lime container glass compositions under this invention.

Having described one exemplary form of the invention, it should be apparent to those skilled in the art that the disclosed embodiment may be modified, and the foregoing description is to be considered exemplary rather than limiting, and the true scope of the invention is that defined in the appended claims.

I claim:

1. The method of forming a glass article comprising the steps of:

shaping a molten mass of glass to a hollow glass article by blowing said glass in a rotating paste mold, the blown article including an annular neck portion and an outer moile portion thereon, releasing the blown article from said mold, cooling the article to set up a compressive stress on the surface thereof, flame severing the moile portion by heating a thin annular region of the glass at the juncture of the moile and neck portions above the melting point of the glass, continuing the application of heat to the severed end of the article and thereby fire polish said end, the heat applied in the removal of the moile portion forming a noncompressive stress in a narrow axially extending zone of the annular glass surface adjacent the flame severed rim, subsequently heating the glass surface of said zone by application of flame to elevate the glass temperature above 1,070°F, and cooling the glass of said zone to a temperature below 900°F by directing cooling media against the glass surface of said zone, thereby placing the neck zone of the article in a condition of compressive stress.

2. The method of claim 1, characterized by the fact that the steps are performed in a succession while the article is moving in a horizontal path, the remainder of the article substantially beyond the narrow annular zone at the rim thereof is continuously cooling from the temperature the glass is at in the shaping step.

3. The method of claim 1, wherein the narrow annular zone of the article is heated to a temperature about 1,250°F and thereafter cooled by the application of air to a temperature below 900°F.

4. The method of claim 3, wherein the article is rotated about its central axis during the application of the cooling air.

5. The method of claim 1, in which the continuing application of the heat to the severed end of the article is sufficient to form an annular bead at said rim.

6. The method of making glass articles comprising
directing a ribbon of molten glass from a supply thereof onto the upper surface of an endless horizontal chain, the latter comprising links each having an orifice therein,
moving the chain and glass ribbon away from said supply, the glass sagging through and below each of the orifices by gravity to form a suspended hollow parison shape,
enclosing each of the suspended parison shapes in a paste mold and rotating said mold while blowing the glass parison to the shape of an article including an upper-end moile portion attached to said glass ribbon,
removing each of the molds from the blown article,
freeing each of the articles from the ribbon by severing the moile therefrom,
grasping the severed articles in series and moving them away from the orifice chain, the articles being cooled sufficiently after forming and during said movement to set up a compressive stress on the surface thereof,
moving the articles in series through a burn-off device,
severing the moile portion from each of the articles by applying heat to a thin annular region of the glass and increasing the glass temperature thereat to the melting point, the heat applied in removal of the moile portion creating a non-compressive stress in a narrow axially extending zone adjacent the rim at the severed end of each article,
reheating the glass of said narrow zone by application of flame to elevate the temperature of the glass above the strain point thereof, and
cooling the glass of said narrow zone by air quench to a temperature below 900°F, said reheating and cooling placing the surface in a condition of compressive stress.

7. The method of claim 6, which includes cooling the glass of each of the blown articles to a temperature on the order of 700° to 1,000°F after heat severing of the moile portion therefrom and prior to the reheating step.

8. The method of claim 7, wherein during the reheating step, the temperature of the glass is elevated in the range of 1,070° to 1,500°F.

9. The method of claim 8, wherein the reheating step is characterized by directing flame against the open end of each of the articles and simultaneously rotating said articles.

10. The method of claim 6, wherein the remainder of each of the articles is at a temperature below 1,000°F during said reheating and cooling of the glass at said narrow zone adjacent the rim of each article.

* * * * *